United States Patent
Nomaru

(10) Patent No.: US 11,794,277 B2
(45) Date of Patent: Oct. 24, 2023

(54) DETECTING APPARATUS

(71) Applicant: DISCO CORPORATION, Tokyo (JP)

(72) Inventor: Keiji Nomaru, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 583 days.

(21) Appl. No.: 17/113,627

(22) Filed: Dec. 7, 2020

(65) Prior Publication Data

US 2021/0178512 A1 Jun. 17, 2021

(30) Foreign Application Priority Data

Dec. 16, 2019 (JP) .................. 2019-226474

(51) Int. Cl.
*B23K 26/03* (2006.01)
*B23K 26/04* (2014.01)
(Continued)

(52) U.S. Cl.
CPC ............ *B23K 26/03* (2013.01); *B23K 26/048* (2013.01); *B23K 26/064* (2015.10);
(Continued)

(58) Field of Classification Search
CPC ............ B23K 26/0853; B23K 2101/40; B23K 2103/50; B23K 26/046; B23K 26/364; B23K 26/40; B23K 26/032; B23K 26/0622; B23K 26/38; B23K 26/0006; B23K 26/02; B23K 26/03; B23K 26/042; B23K 26/53; B23K 26/705; B23K 2103/56; B23K 26/06; B23K 26/064; B23K 26/0648; B23K 26/0676; B23K 26/067; B23K 26/082; B23K 26/0869; B23K 26/359; B23K 26/382; B23K 26/04; B23K 26/034;
(Continued)

(56) References Cited

U.S. PATENT DOCUMENTS

2009/0266802 A1* 10/2009 Sawabe .............. B23K 26/0853
219/121.78
2009/0277889 A1* 11/2009 Kobayashi ............. B23K 26/53
219/121.78

(Continued)

FOREIGN PATENT DOCUMENTS

JP 0775955 A 3/1995

*Primary Examiner* — Chris Q Liu
(74) *Attorney, Agent, or Firm* — Greer Burns & Crain Ltd.

(57) ABSTRACT

A mechanism for detecting the inside of a workpiece includes a wavelength delaying unit for outputting each pulse of a pulsed laser beam emitted from a laser oscillator with time differences imparted to respective wavelengths, and a ring generating unit for generating a ring-shaped pulsed laser beam from the pulsed laser beam with the time differences imparted to the respective wavelengths and diffracting the ring-shaped pulsed laser beam into ring-shaped laser beams ranging from small to large at the respective wavelengths. When the ring-shaped laser beams with the time differences imparted to the respective wavelengths are applied to the workpiece, they produce an interference wave of ultrasonic waves in the workpiece, and vibrations are produced at a position where the interference wave of the ultrasonic waves is converged. A laser beam is applied to an upper surface of the workpiece at a position aligned with the center of the vibrations.

5 Claims, 3 Drawing Sheets

(51) Int. Cl.
  *B23K 26/064* (2014.01)
  *H01S 3/08* (2023.01)
  *B23K 26/08* (2014.01)
  *B23K 101/40* (2006.01)

(52) U.S. Cl.
  CPC ...... *B23K 26/0853* (2013.01); *H01S 3/08009* (2013.01); *B23K 2101/40* (2018.08)

(58) Field of Classification Search
  CPC .............. B23K 26/048; B23K 26/0613; B23K 26/0624; B23K 26/0665; B23K 26/0643; B23K 26/0823; B23K 26/0876; B23K 26/354; B23K 26/3584; B23K 26/36; B23K 26/361; B23K 26/362; B23K 26/348; B23K 26/20; B23K 26/352; B23K 26/402; B23K 26/60; B23K 2101/001
  USPC ............ 219/121.67, 121.78, 121.82, 121.64, 219/121.72, 121.73
  See application file for complete search history.

(56) References Cited

U.S. PATENT DOCUMENTS

| | | | |
|---|---|---|---|
| 2009/0310628 A1* | 12/2009 | Yamazaki | B23K 26/705 372/6 |
| 2010/0044358 A1* | 2/2010 | Furuta | B23K 26/046 219/121.72 |
| 2011/0180521 A1* | 7/2011 | Quitter | B23K 26/046 219/121.73 |
| 2012/0103952 A1* | 5/2012 | Nomaru | B23K 26/40 219/121.67 |
| 2012/0138586 A1* | 6/2012 | Webster | B23K 26/20 219/121.64 |
| 2013/0334185 A1* | 12/2013 | Nomaru | B23K 26/042 219/121.82 |
| 2013/0334186 A1* | 12/2013 | Nomaru | B23K 26/02 219/121.82 |
| 2014/0299586 A1* | 10/2014 | Sawabe | B23K 26/04 219/121.67 |
| 2017/0120337 A1* | 5/2017 | Kanko | B33Y 10/00 |
| 2018/0128686 A1* | 5/2018 | Wakabayashi | B23K 26/354 |
| 2018/0304409 A1* | 10/2018 | Nakamura | B23K 26/032 |

* cited by examiner

DETECTING APPARATUS

BACKGROUND OF THE INVENTION

Field of the Invention

The present invention relates to a detecting apparatus including a detecting mechanism for detecting the inside of a workpiece held on a chuck table.

Description of the Related Art

Wafers with a plurality of devices such as integrated circuits (ICs), large-scale integration (LSI) circuits, etc. formed in respective areas that are demarcated on a face side thereof by a plurality of intersecting projected dicing lines are divided by a dicing apparatus or a laser processing apparatus into individual device chips which will be used in electric appliances such as mobile phones, personal computers, and so on.

For dividing a wafer with devices, which should be free of dirt, such as micro-electric-mechanical systems (MEMS), charge-coupled devices (CCD), complementary metal oxide semiconductors (CMOS), or the like formed on its face side into individual device chips, the face side of the wafer is held on a protective tape, projected dicing lines established on the face side of the wafer are detected from a reverse side of the wafer by an infrared camera, and the wafer is diced or laser-processed from the reverse side thereof.

SUMMARY OF THE INVENTION

However, if a reverse side of a wafer is overlaid with a metal film, then since infrared rays cannot be transmitted through the metal film, the projected dicing lines established on the face side of the wafer cannot be detected from the reverse side of the wafer by an infrared camera.

It is therefore an object of the present invention to provide a detecting apparatus that is capable of detecting projected dicing lines on a face side of a workpiece from a reverse side thereof even in a case where the projected dicing lines on the face side cannot be detected from the reverse side by an infrared camera.

In accordance with an aspect of the present invention, there is provided a detecting apparatus including a chuck table having a holding surface defined by X- and Y-axis coordinates for holding a workpiece thereon and a detecting mechanism for detecting an inside of the workpiece held on the chuck table. The detecting mechanism includes a laser oscillator for oscillating pulsed laser in a wide-band range of wavelengths, wavelength delaying means for outputting each pulse of a pulsed laser beam emitted from the laser oscillator with time differences imparted to respective wavelengths as a pulsed laser beam, ring-shaped generating means for generating a ring-shaped pulsed laser beam from the pulsed laser beam with the time differences imparted to the respective wavelengths and diffracting the ring-shaped pulsed laser beam into ring-shaped laser beams ranging from small to large ring-shaped laser beams at the respective wavelengths, a beam splitter for branching the ring-shaped pulsed laser beam diffracted into the ring-shaped laser beams ranging from the small to large ring-shaped laser beams, a scanning scanner for scanning the ring-shaped pulsed laser beam branched into a first direction by the beam splitter in X-axis coordinate directions, an indexing scanner for indexing the ring-shaped pulsed laser beam in Y-axis coordinate directions, an fθ lens for applying the ring-shaped pulsed laser beam diffracted into the ring-shaped laser beams ranging from the small to large ring-shaped laser beams to an upper surface, defined by X- and Y-axis coordinates, of the workpiece held on the chuck table, a laser beam applying device for applying a detecting laser beam branched into a second direction by the beam splitter, a half-silvered mirror disposed between the laser beam applying device and the beam splitter, a returning mirror disposed such that the half-silvered mirror and the returning mirror are disposed one on each side of the beam splitter, for returning the detecting laser beam that has passed through the half-silvered mirror to the half-silvered mirror, a photodetector for detecting a laser beam reflected by the half-silvered mirror, and image generating means for generating an image from intensity of the laser beam detected by the photodetector and the X- and Y-axis coordinates of the upper surface of the workpiece to which the ring-shaped laser beams are applied. When the ring-shaped laser beams ranging from the small to large ring-shaped laser beams are applied to the upper surface of the workpiece held on the chuck table, the ring-shaped laser beams generate ultrasonic waves in the workpiece, and an interference wave of the ultrasonic waves is converged at a position defined by a Z-axis coordinate in the workpiece to produce vibrations, and the detecting laser beam is applied to the upper surface of the workpiece at a position aligned with the position where the vibrations are produced, and reflected by the upper surface of the workpiece as a first return laser beam modulated by the vibrations, and an interference laser beam produced from the first return laser beam and a second return laser beam generated from the detecting laser beam returned by the returning mirror is guided by the half-silvered mirror to the photodetector, and the image generating means generates an image representing a state near the position where the interference wave is converged.

Preferably, the time differences of the pulsed laser beam diffracted into the ring-shaped laser beams ranging from the small to large ring-shaped laser beams at the respective wavelengths by the ring-shaped generating means are adjusted by the wavelength delaying means thereby to adjust the position defined by the Z-axis coordinate at which the interference wave of the ultrasonic waves is converged in the workpiece.

Preferably, the position defined by the Z-axis coordinate at which the interference wave of the ultrasonic waves is converged in the workpiece is adjusted by delaying, with the wavelength delaying means, time t calculated according to:

$$(H1-H2)/V=t$$

where H1 represents a distance from the position at which the interference wave of the ultrasonic waves is converged in the workpiece to the large ring-shaped laser beam on the upper surface of the workpiece, H2 represents a distance from the position at which the interference wave of the ultrasonic waves is converged in the workpiece to one of the ring-shaped laser beams that is positioned adjacent to the large ring-shaped laser beam, and V represents a speed of the ultrasonic waves propagated in the workpiece. Preferably, the ring generating means is an axicon lens assembly including a pair of axicon lenses and a diffraction grating or a diffractive optical element.

According to the present invention, even though no infrared rays are transmittable through a workpiece because of a metal film on a reverse side thereof and a state of a face side of the workpiece cannot be detected from the reverse side by an infrared camera, projected dicing lines, for example, on the face side can nevertheless be detected from the reverse side by the detecting mechanism.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
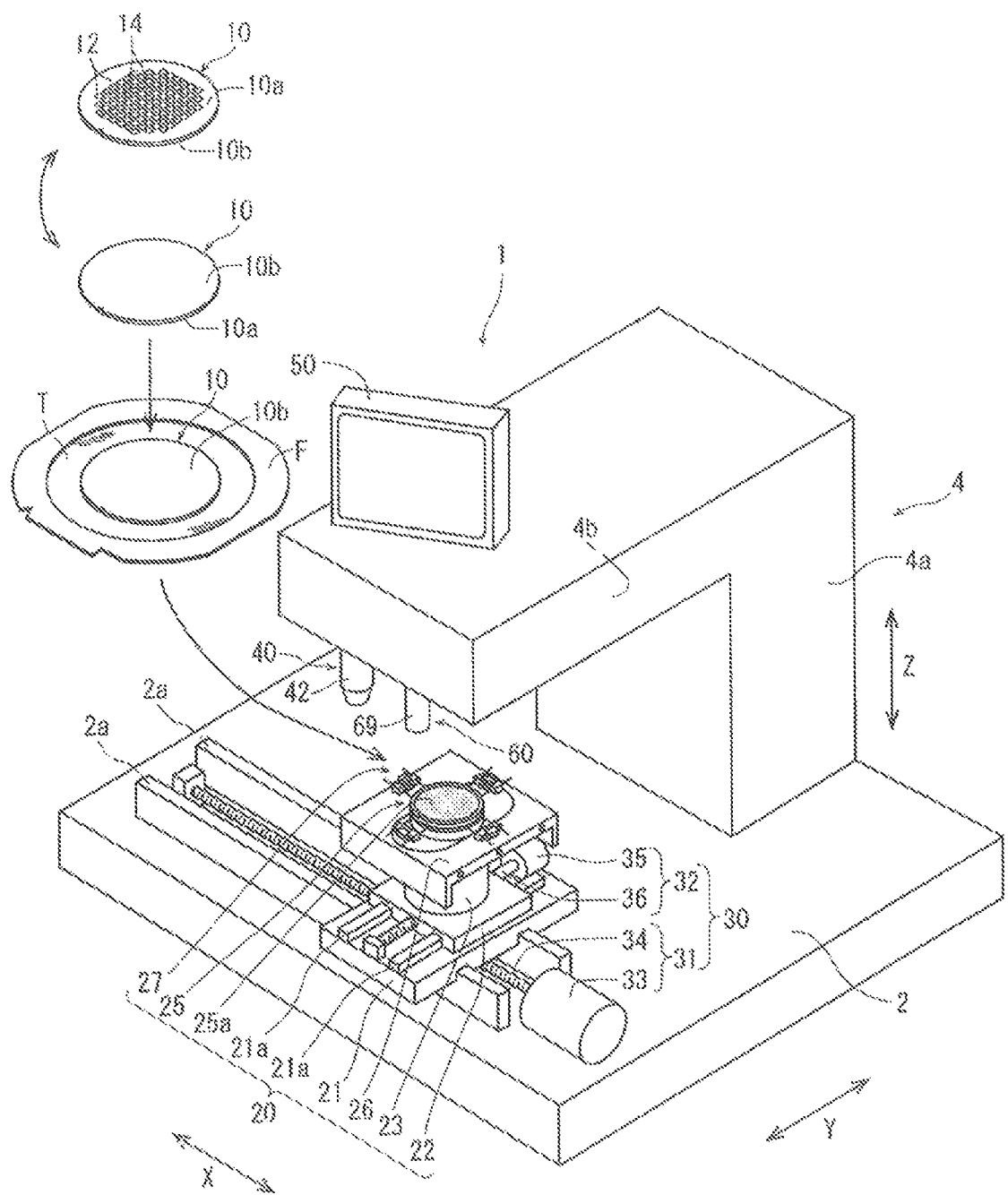
FIG. 1 is a perspective view of a laser processing apparatus incorporating therein a detecting apparatus according to an embodiment of the present invention.

A detecting apparatus according to an embodiment of the present invention will be described in detail below with reference to the accompanying drawings. FIG. 1 illustrates in perspective a laser processing apparatus 1 incorporating therein the detecting apparatus according to the present embodiment.

As illustrated in FIG. 1, the laser processing apparatus, denoted by 1, includes a holding unit 20 for holding a workpiece, a moving mechanism 30 for moving the holding unit 20, a laser beam applying unit 40 for applying a laser beam to the workpiece held by the holding unit 20, a display unit 50, and a detecting mechanism 60 that cooperates with the holding unit 20 in making up the detecting apparatus according to the present embodiment.

The holding unit 20 includes a rectangular X-axis movable plate 21 mounted on an apparatus base 2 and movable in X-axis directions indicated by the arrow X in the figure, a rectangular Y-axis movable plate 22 mounted on the X-axis movable plate 21 and movable in Y-axis directions indicated by the arrow Y in the figure, which are perpendicular to the X-axis directions, a hollow cylindrical support post 23 fixedly mounted on an upper surface of the Y-axis movable plate 22, and a rectangular cover plate 26 fixedly mounted on an upper end of the support post 23. The cover plate 26 has an oblong hole defined therein with a circular chuck table 25 disposed therein. The chuck table 25 is rotatable about a central axis thereof by rotary actuator means, not illustrated. The chuck table 25 has an upper surface acting as a holding surface 25a defined in a horizontal plane by an X-axis parallel to the X-axis directions and a Y-axis parallel to the Y-axis directions. The holding surface 25a is made of a porous material and is hence permeable to air, and is connected to a suction means, not illustrated, through a fluid channel defined in and extending through the support post 23.

A plurality of clamps 27 are disposed on the chuck table 25 for securing an annular frame F that supports the workpiece through a protective tape T. As illustrated in FIG. 1, the workpiece according to the present embodiment is a wafer 10, for example, including a silicon substrate that has a plurality of devices 12 formed on a face side thereof in respective areas demarcated by a grid of projected dicing lines 14. The wafer 10 is held by the annular frame F with the face side 10a inverted and affixed to the protective tape T for protection of the devices 12 and a reverse side 10b facing upwardly. The reverse side 10b is overlaid with a metal film that prevents infrared rays from being transmitted therethrough, so that the face side 10a cannot be detected by infrared rays applied to the wafer 10 from the reverse side 10b.

The moving mechanism 30 is disposed on the apparatus base 2, and includes an X-axis feeding mechanism 31 for processing-feeding the holding unit 20 along the X-axis directions and a Y-axis feeding mechanism 32 for indexing-feeding the holding unit 20 along the Y-axis directions. The X-axis feeding mechanism 31 converts rotary motion from a stepping motor 33 into linear motion via the ball screw 34 and transmits the linear motion to the X-axis movable plate 21 to move the X-axis movable plate 21 in one of the X-axis directions and the other along a pair of guide rails 2a on the apparatus base 2. The Y-axis feeding mechanism 32 converts rotary motion from a stepping motor 35 into linear motion via the ball screw 36 and transmits the linear motion to the Y-axis movable plate 22 to move the Y-axis movable plate 22 in one of the Y-axis directions and the other along a pair of guide rails 21a on the X-axis movable plate 21. Although not illustrated, position detecting means are disposed respectively on the X-axis feeding mechanism 31, the Y-axis feeding mechanism 32, and the chuck table 25 for detecting X- and Y-axis coordinates and angular position of the chuck table 25. Positional information representing the X- and Y-axis coordinates and angular position of the chuck table 25 is sent from the position detecting means to a control unit, not illustrated. On the basis of the supplied positional information, the control unit issues instruction signals for actuating the X-axis feeding mechanism 31, the Y-axis feeding mechanism 32, and the rotary actuator means combined with the chuck table 25 to position the chuck table 25 in a desired position over the apparatus base 2.

As illustrated in FIG. 1, an upstanding frame body 4 is mounted on the apparatus base 2 alongside of the moving mechanism 30. The frame body 4 includes a vertical wall 4a disposed on the apparatus base 2 and a horizontal beam 4b extending from an upper end of the vertical wall 4a. The horizontal beam 4b houses therein an optical system, not illustrated, including the laser beam applying unit 40. The optical system also includes a beam condenser 42 disposed on a lower surface of a distal end of the horizontal beam 4b.

The horizontal beam 4b also houses therein the detecting mechanism 60 for detecting the inside of the wafer 10 held by the holding unit 20. The holding unit 20 and the detecting mechanism 60 jointly make up the detecting apparatus according to the present embodiment as described above.

Figure 2:
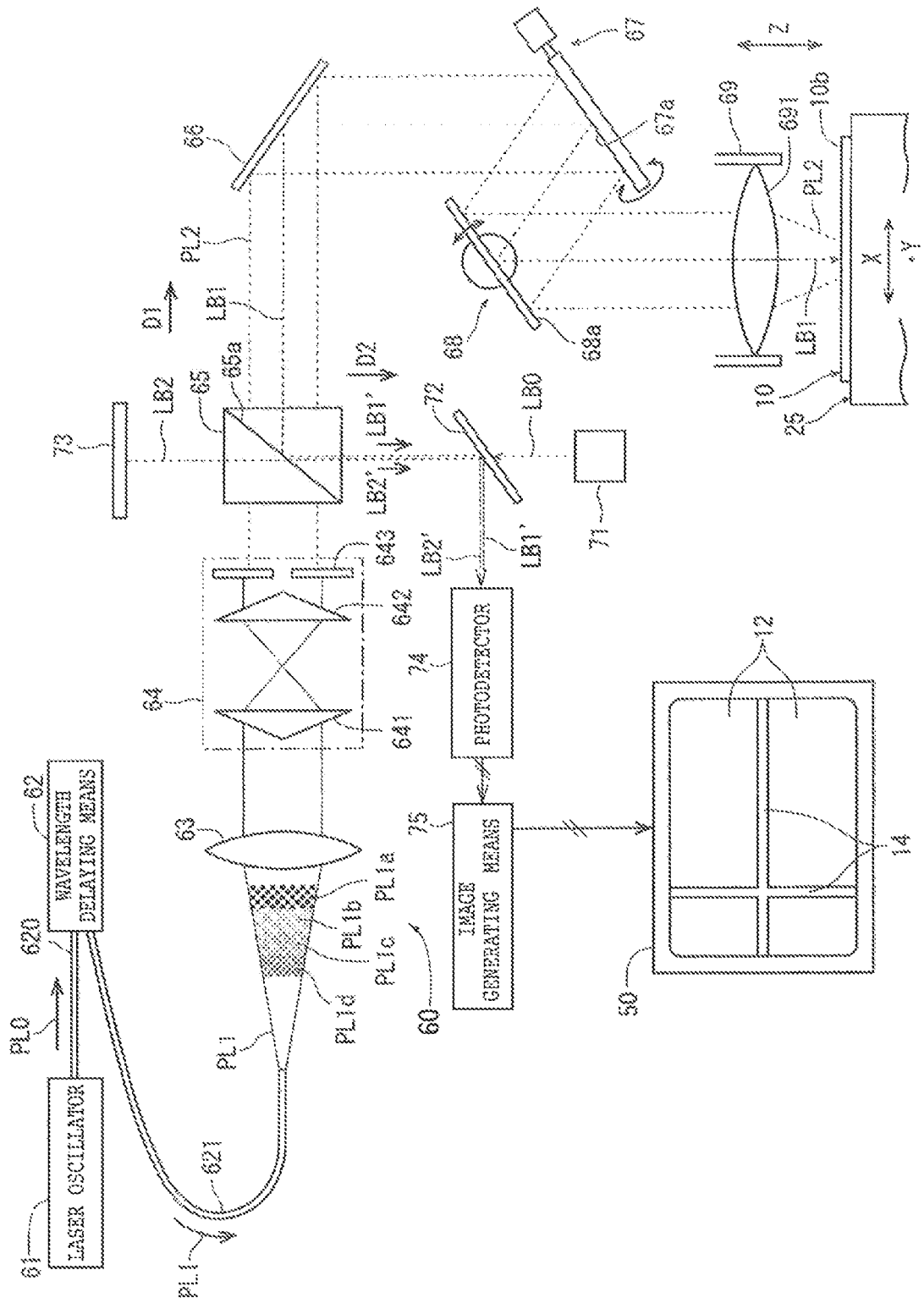
FIG. 2 is a block diagram illustrating structural details of a detecting mechanism of the detecting apparatus illustrated in FIG. 1.

FIG. 2 illustrates in block diagram an optical system of the detecting mechanism 60. As illustrated in FIG. 2, the detecting mechanism 60 includes a laser oscillator 61 for oscillating pulsed laser in a wide wavelength range from 400 to 800 nm, for example, wavelength delaying means 62 for outputting each pulse of a pulsed laser beam PL0 emitted from the laser oscillator 61 with time differences imparted to respective wavelengths as a pulsed laser beam PL1, ring-shaped generating means 64 for generating a ring-shaped pulsed laser beam from the pulsed laser beam PL1 and diffracting the ring-shaped pulsed laser beam into ring-shaped laser beams ranging from small to large ring-shaped laser beams at the respective wavelengths, and generating and outputting a pulsed laser beam PL2, a beam splitter 65 having a function to branch a laser beam passing therethrough into appropriate directions, an indexing scanner 67 constructed as a galvanometer scanner, for example, for indexing the pulsed laser beam PL2 branched into a first direction D1 by the beam splitter 65 in Y-axis coordinate directions over the chuck table 25 of the holding unit 20, a scanning scanner 68 constructed as a resonant scanner, for example, for scanning the pulsed laser beam PL2 in X-axis coordinate directions over the chuck table 25, and a detecting beam condenser 69 including an fθ lens 691 for converging the pulsed laser beam PL2 diffracted into the ring-shaped laser beams ranging from the small to large ring-shaped laser beams onto the reverse side 10b, facing upwardly, of the wafer 10 held on the chuck table 25 at positions defined by X-axis and Y-axis coordinates thereon.

The pulsed laser beam PL0 emitted from the laser oscillator 61 is guided through an optical fiber 620 to the wavelength delaying means 62. The wavelength delaying means 62 may be realized by an optical fiber that causes wavelength dispersion, for example. More specifically, the optical fiber, not illustrated, of the wavelength delaying means 62 may include therein diffraction gratings having different reflecting positions at respective wavelengths, e.g., providing shorter reflection distances for laser beams having longer wavelengths and longer reflection distances for laser beams having shorter wavelengths. The wavelength delaying means 62 can thus generate the pulsed laser beam PL1 that is emitted from an optical fiber 621 connected to an output side of the wavelength delaying means 62 such that each pulse of the pulsed laser beam PL1 is output with predetermined respective time differences imparted to a sequence of longer wavelengths, e.g., a red laser beam PL1a, a yellow laser beam PL1b, a green laser beam PL1c, and a blue laser beam PL1d are output with predetermined respective time differences.

The pulsed laser beam PL1 that has been given the time differences imparted to the respective wavelengths by the wavelength delaying means 62 is converted by a collimation lens 63 to a parallel beam, which is then introduced into the ring-shaped generating means 64. The ring-shaped generating means 64 is arranged as an axicon lens assembly including a pair of axicon lenses 641 and 642 and a doughnut-shaped diffraction grating 643 that is radially symmetrical, for example. When the pulsed laser beam PL1 travels through the axicon lenses 641 and 642, the pulsed laser beam PL1 is converted to a ring-shaped laser beam. When the ring-shaped laser beam travels through the diffraction grating 643, the ring-shaped laser beam is diffracted into ring-shaped laser beams ranging from small to large ring-shaped laser beams at the respective wavelengths, thereby generating the pulsed laser beam PL2. The sizes of the ring-shaped laser beams of the pulsed laser beam PL2 can be adjusted by adjusting the distance between the axicon lenses 641 and 642. According to the present embodiment, the axicon lens assembly is used as means for diffracting the pulsed laser beam PL1 into ring-shaped laser beams ranging from small to large ring-shaped laser beams at the respective wavelengths. According to the present invention, however, the means for diffracting the pulsed laser beam PL1 is not limited to the axicon lens assembly, but may be a diffractive optical element (DOE), for example.

The pulsed laser beam PL2 that has been diffracted into ring-shaped laser beams ranging from small to large ring-shaped laser beams at the respective wavelengths is introduced into the beam splitter 65. The pulsed laser beam PL2 introduced into the beam splitter 65 passes through a reflecting surface 65a therein and is guided to travel in the first direction D1 to a reflecting mirror 66, which changes the optical path of the pulsed laser beam PL2 to guide the pulsed laser beam PL2 to the indexing scanner 67 that indexes the pulsed laser beam PL2 in the Y-axis coordinate directions. The indexing scanner 67 has its reflecting surface 67a controlled by the control unit, not illustrated, to control the position on the chuck table 25 to which the pulsed laser beam PL2 is applied, accurately in indexing feed directions, i.e., the Y-axis directions, perpendicular to the sheet of FIG. 2. The pulsed laser beam PL2 reflected by the reflecting surface 67a of the indexing scanner 67 is guided to the scanning scanner 68. The scanning scanner 68 has its reflecting surface 68a controlled by the control unit, not illustrated, to control the position on the chuck table 25 to which the pulsed laser beam PL2 is applied, accurately in scanning directions, i.e., the X-axis directions, parallel to the sheet of FIG. 2. The pulsed laser beam PL2 that has been controlled by the indexing scanner 67 and the scanning scanner 68 in terms of the directions along which the pulsed laser beam PL2 travels toward the chuck table 25 is guided to the fθ lens 691 and converged thereby onto predetermined positions defined by X- and Y-axis coordinates on the upper surface, i.e., the reverse side 10b, of the wafer 10 on the chuck table 25.

The detecting mechanism 60 according to the present embodiment further includes a laser beam applying device 71 for applying a detecting laser beam LB0, the laser beam applying device 71 being disposed in a second direction D2 along which a laser beam is branched by the beam splitter 65, a half-silvered mirror 72 disposed between the laser beam applying device 71 and the beam splitter 65, a returning mirror 73 disposed on a side of the beam splitter 65 remote from the half-silvered mirror 72 such that the half-silvered mirror 72 and the returning mirror 73 are disposed one on each side of the beam splitter 65, a photodetector 74 for detecting a laser beam returning via the beam splitter 65 to the half-silvered mirror 72 and reflected by the half-silvered mirror 72, and image generating means, i.e., an analyzer, 75 for generating an image from the intensity of the laser beam detected by the photodetector 74 and information of the positions defined by X- and Y-axis coordinates on the chuck table 25 to which the pulsed laser beam PL2 is applied.

The laser beam applying device 71 is constructed as a laser diode (LD), for example. The detecting laser beam LB0 emitted from the laser beam applying device 71 passes through the half-silvered mirror 72 into the beam splitter 65, which divides the detecting laser beam LB0 into a branched laser beam LB1 reflected by the reflecting surface 65a and traveling in the first direction D1 and a branched laser beam LB2 transmitted through the reflecting surface 65a. The branched laser beam LB1 reflected by the reflecting surface 65a travels in the center of the pulsed laser beam PL2, and is indexed and scanned by the indexing scanner 67 and the scanning scanner 68 to travel through the fθ lens 691 to the predetermined positions defined by X- and Y-axis coordinates on the reverse side 10b of the wafer 10 on the chuck table 25.

The branched laser beam LB1 applied to the reverse side 10b of the wafer 10 is reflected thereby as a first return laser beam LB1', is reflected by the scanning scanner 68, the indexing scanner 67, and the reflecting mirror 66, is then reflected by the reflecting surface 65a of the beam splitter 65 to travel in the second direction D2, and is applied to the half-silvered mirror 72. The branched laser beam LB2 transmitted through the reflecting surface 65a of the beam splitter 65 is reflected by the returning mirror 73 and transmitted through the reflecting surface 65a as a second return laser beam LB2'. At this time, the second return laser beam LB2' travels along the same optical path as the first return laser beam LB1'. The first return laser beam LB1' that is modulated by vibrations of the reverse side 10b of the wafer 10 and the second return laser beam LB2' functioning as a reference laser beam not affected by the wafer 10 jointly make up an interference laser beam, which is reflected by the half-silvered mirror 72 to travel to the photodetector 74. The image generating means 75 generates an image on the basis the intensity of the laser beam detected by the photodetector 74, i.e., the interference laser beam that combines the first return laser beam LB1' and second return laser beam LB2', and the X- and Y-coordinates representing the positions on the reverse side 10b of the wafer 10 to which the detecting laser beam LB1 is applied, and outputs the generated image to the display unit 50.

The detecting mechanism 60 is generally configured as described above. Functions and operation of the detecting mechanism 60 will be described below also with reference to FIG. 3.

As illustrated in FIG. 1, the wafer 10 prepared as the workpiece is held under suction on the chuck table 25 of the holding unit 20 and secured in position by the clamps 27. With the wafer 10 secured to the chuck table 25, the moving mechanism 30 is actuated to move the chuck table 25 to position a predetermined detection area of the wafer 10 directly below the detecting beam condenser 69 that includes the fθ lens 691. Then, the laser oscillator 61 is energized to oscillate pulsed laser and to generate and output, through the wavelength delaying means 62 and the ring-shaped generating means 64, the pulsed laser beam PL2 having time differences imparted to respective wavelengths and diffracted into a plurality of ring-shaped laser beams ranging from small to large ring-shaped laser beams at the respective wavelengths. The pulsed laser beam PL2 is transmitted through and branched by the beam splitter 65 to travel in the first direction D1, and then applied to positions defined by X- and Y-axis coordinates in the detection area on the reverse side 10b of the wafer 10 held on the chuck table 25 through the indexing scanner 67 and the scanning scanner 68 that are controlled by the control unit, not illustrated, and also through the fθ lens 691.

Figure 3:
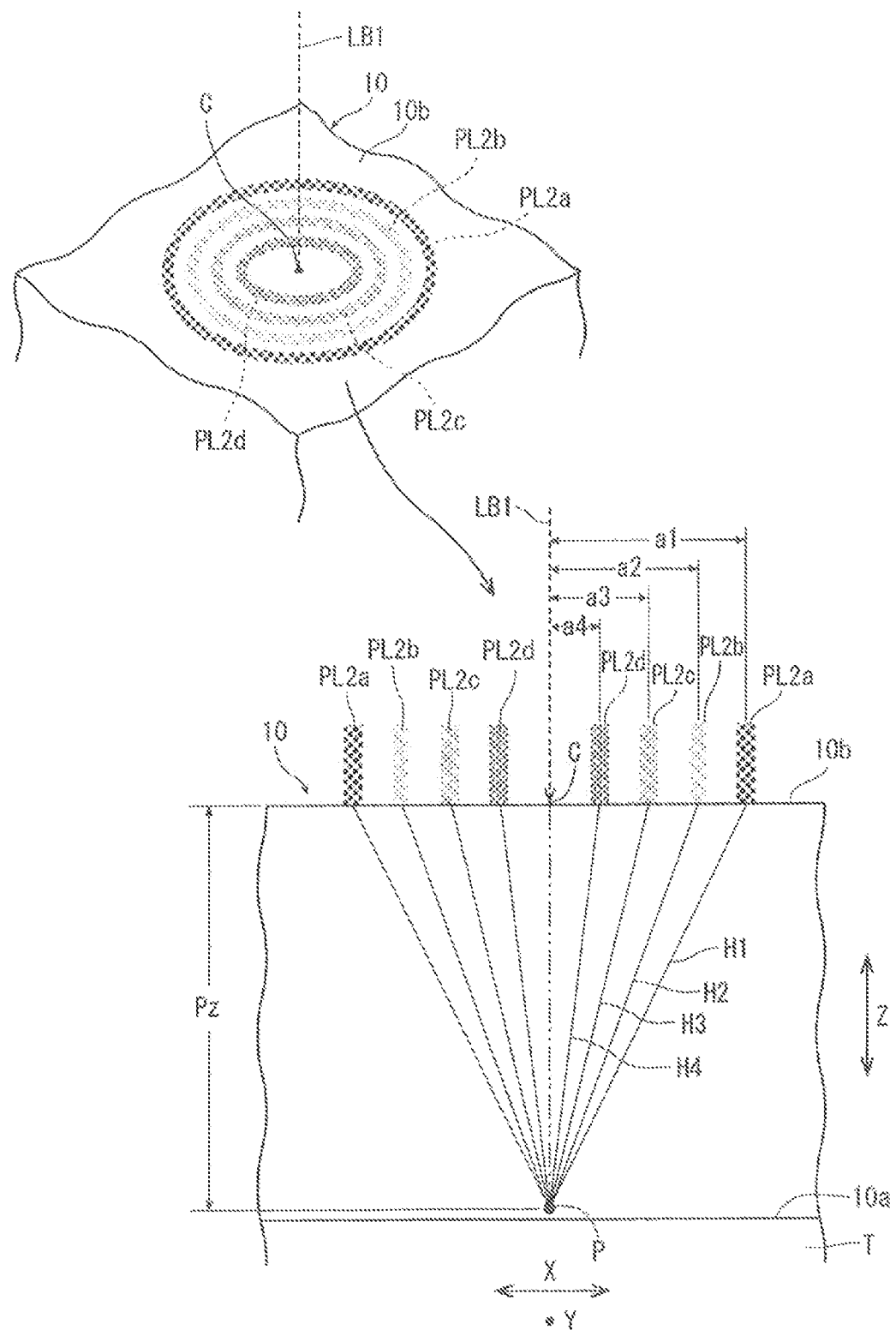
FIG. 3 is a conceptual view illustrating the manner in which ultrasonic waves are generated on the basis of a plurality of ring-shaped laser beams applied to a wafer to detect the state of the wafer.

According to the present embodiment, as illustrated in FIG. 3, the pulsed laser beam PL2 includes a ring-shaped laser beam PL2a produced from a red laser beam PL1a, a ring-shaped laser beam PL2b produced from a yellow laser beam PL1b, a ring-shaped laser beam PL2c produced from a green laser beam PL1c, and a ring-shaped laser beam PL2d produced from a blue laser beam PL1d, arranged successively in the order of descending diameters. The ring-shaped laser beams PL2a, PL2b, PL2c, and PL2d are applied concentrically around a center C on the reverse side 10b of the wafer 10. The ring-shaped laser beam PL2a that is of the largest diameter reaches the reverse side 10b of the wafer 10 at the earliest timing, and then the ring-shaped laser beams PL2b, PL2c, PL2d that are successively smaller in diameter reach the reverse side 10b of the wafer 10 with respective time differences t1, t2, and t3. According to the present embodiment, the pulsed laser beam PL2 is diffracted into four wavelength ranges for illustrative purposes. Actually, however, the pulsed laser beam PL2 is diffracted into a range of 10 to 20 wavelength ranges.

According to the present embodiment, the reverse side 10b of the wafer 10 is overlaid with the metal film, and hence the pulsed laser beam PL2 including the ring-shaped laser beams PL2a through PL2d are not transmitted through the wafer 10. However, when the ring-shaped laser beams PL2a through PL2d reach the reverse side 10b, they generate ultrasonic waves that are propagated through the wafer 10 from the points where the ring-shaped laser beams PL2a through PL2d reach the reverse side 10b. By appropriately establishing the time differences t1 through t3 with which the ring-shaped laser beams PL2a through PL2d reach the reverse side 10b with respect to the ring-shaped laser beam PL2a, it is possible to converge an interference wave of the ultrasonic waves at a position P defined by a desired Z-axis coordinate in the thicknesswise directions of the wafer 10 on the center of the ring-shaped laser beams PL2a through PL2d applied to the reverse side 10b. According to the present embodiment, the position P is established in the vicinity of the face side 10a of the wafer 10 in order to detect a state near the face side 10a.

The time differences t1 through t3 are appropriately established as follows: The diameters of the ring-shaped laser beams PL2a through PL2d applied to the reverse side 10b of the wafer 10 are of values established by the diffraction grating 643 of the ring-shaped generating means 64. For example, the diameters of the ring-shaped laser beams PL2a through PL2d are established respectively as a1 through a4 as illustrated in FIG. 3. If the Z-axis coordinate, i.e., the depth, of the position P where the operator wishes to converge the interference wave of the ultrasonic waves generated by the ring-shaped laser beams PL2a through PL2d, from the center C of the ring-shaped laser beams PL2a through PL2d in the thicknesswise directions of the wafer 10 is represented by Pz, then distances H1 through H4 from the points where the ring-shaped laser beams PL2a through PL2d reach the reverse side 10b of the wafer 10 to the position P are calculated according to the following equations:

$$H1=(a1^2+Pz^2)^{1/2}$$

$$H2=(a2^2+pz^2)^{1/2}$$

$$H3=(a3^2+pz^2)^{1/2}$$

$$H4=(a4^2+pz^2)^{1/2}$$

When the ring-shaped laser beams PL2a through PL2d reach the reverse side 10b of the wafer 10 with the time differences t1 through t3 and generate ultrasonic waves that are propagated through the wafer 10, the time differences t1 through t3 should be established to satisfy the equations illustrated below in order to converge the interference wave of the ultrasonic waves at the position P. In the equations, V indicates the speed (m/s) at which the ultrasonic waves are propagated through the wafer 10, the speed depending on the material of the wafer 10.

$$(H1-H2)/V=t1$$

$$(H2-H3)/V=t2$$

$$(H3-H4)/V=t3$$

The time differences t1 through t3 can be adjusted by the wavelength delaying means 62. Specifically, the positions of the diffraction gratings, not illustrated, disposed correspondingly to the respective wavelengths of the pulsed laser beam PL0 in the optical fiber of the wavelength delaying means 62 may be changed to provide the above time differences t1 through t3.

When the ring-shaped laser beams PL2a through PL2d are applied with the time differences t1 through t3 satisfying the above conditions to the reverse side 10b of the wafer 10, the ring-shaped laser beams PL2a through PL2d generate ultrasonic waves that are propagated through the wafer 10.

The interference wave of the ultrasonic waves are converged at the position P, producing intensive vibrations in the wafer 10. Part of the vibrations is reflected in the vicinity of the position P and propagated through the wafer 10 to a point on the upper surface of the wafer 10 aligned with the position P, i.e., the center C of the right laser beams PL2a through PL2d on the reverse side 10b of the wafer 10, vibrating the reverse side 10b. The vibrations of the reverse side 10b depend on the state in the vicinity of the position P where the ultrasonic waves are converged.

According to the present embodiment, the laser beam applying device 71 applies the detecting laser beam LB0 to the beam splitter 65, which divides the detecting laser beam LB0 into the branched laser beam LB1 that is applied to the reverse side 10b at the center C of the ring-shaped laser beams PL2a through PL2d. When the branched laser beam LB1 reaches the center C and is reflected from the reverse side 10b, it is reflected as the first return laser beam LB1' that is modulated by the vibrations of the reverse side 10b. The reflected and modulated first return laser beam LB1' is reflected by the scanning scanner 68, the indexing scanner 67, the reflecting mirror 66, and the reflecting surface 65a of the beam splitter 65, and reaches the half-silvered mirror 72. At the same time, the branched laser beam LB2 of the detecting laser beam LB0 emitted from the laser beam applying device 71 and transmitted through the beam splitter 65 is reflected by the returning mirror 73 as the second return laser beam LB2', which is combined with the first return laser beam LB1' by the reflecting surface 65a of the beam splitter 65 and reaches the half-silvered mirror 72. The first return laser beam LB1' that is reflected by the half-silvered mirror 72 and the second return laser beam LB2' functioning as the reference laser beam not affected by the wafer 10 jointly produce the interference laser beam whose intensity is detected by the photodetector 74. The detected intensity and the X- and Y-axis coordinates of the center C on the reverse side 10b of the wafer 10 are transmitted to the image generating means 75.

According to the present embodiment, the detecting mechanism 60 includes the scanning scanner 68 and the indexing scanner 76. The scanning scanner 68 and the indexing scanner 76 are actuated to apply the ring-shaped laser beams PL2a through PL2d and the branched laser beam LB1 successively to positions in the entire predetermined detection area defined by X- and Y-axis coordinates on the wafer 10, and the photodetector 74 detects the intensities of the pulsed laser beam PL2 and the branched laser beam LB1 each time the ring-shaped laser beams PL2a through PL2d and the branched laser beam LB1 are applied to one of the positions and transmits the detected intensities, together with information of the pulsed laser beam PL2 and the position to which the branched laser beam LB1 is applied, i.e., the positional information of the X- and Y-axis coordinates of the center C of the ring-shaped laser beams PL2a through PL2d, to the image generating means 75.

The image generating means 75 generates an image of the face side 10a at the position where the branched laser beam LB1 of the detecting laser beam LB0 is applied to the detection area, on the basis of changes in the intensity of the first return laser beam LB1' which are clearly grasped from the interference wave generated from the first return laser beam LB1' and the second return laser beam LB2'. For example, in a case where there are devices 12 near the position P where the ultrasonic waves are converged in the wafer 10, the converged ultrasonic waves are reflected by the devices 12 and vibrations thereof reach the center C of the reverse side 10b, so that the photodetector 74 detects a strong interference wave. On the other hand, in a case where the position P is located near projected dicing lines 14, the ultrasonic waves are essentially not reflected and no vibrations are applied to the reverse side 10b of the wafer 10, so that the photodetector 74 detects essentially no interference wave.

Image information including the positional information of the devices 12 and the projected dicing lines 14 on the face side 10a in the detection area is displayed on the display unit 50 as illustrated in FIG. 2. The image information in the detection area displayed on the display unit 50 is stored, together with the information of the corresponding X- and Y-axis coordinates, in the control unit, not illustrated. The moving mechanism 30 is actuated to move the chuck table 25 to position different areas of the wafer 10 successively in the detection area detected by the detecting mechanism 60, and the devices 12 and the projected dicing lines 14 on the face side 10a are detected and stored according to the sequence described above. When the state of the face side 10a of the wafer 10 has been detected, the chuck table 25 is positioned directly below the beam condenser 42 of the laser beam applying unit 40, and the laser beam applying unit 40 is energized to process the wafer 10 using the positional information.

According to the present embodiment, even though no infrared rays are transmittable through the wafer 10 because of the metal film on the reverse side 10b thereof and the projected dicing lines 14 on the face side 10a cannot be detected from the reverse side 10b by an infrared camera, the projected dicing lines 14 on the face side 10a can nevertheless be detected from the reverse side 10b by the detecting mechanism 60.

The present invention is not limited to the embodiment described above, but covers changes and modifications therein. For example, while the pulsed laser beam PL0 is diffracted into four ring-shaped laser beams PL2a through PL2d with time differences imparted to respective four wavelengths. However, the present invention is not limited to such details, but the pulsed laser beam PL0 may be diffracted into a plurality of ring-shaped laser beams with no limitations posed on the number of ring-shaped laser beams.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A detecting apparatus comprising:
   a chuck table having a holding surface defined by X- and Y-axis coordinates for holding a workpiece thereon and;
   a detecting mechanism for detecting an inside of the workpiece held on the chuck table,
   wherein the detecting mechanism includes
      a laser oscillator for oscillating pulsed laser in a wide-band range of wavelengths,
      wavelength delaying means for outputting each pulse of a pulsed laser beam emitted from the laser oscillator with time differences imparted to respective wavelengths as a pulsed laser beam,
      ring-shaped generating means for generating a ring-shaped pulsed laser beam from the pulsed laser beam with the time differences imparted to the respective wavelengths and diffracting the ring-shaped pulsed laser beam into ring-shaped laser beams ranging from small to large ring-shaped laser beams at the respective wavelengths, a beam splitter for branching the ring-shaped pulsed laser beam diffracted into the ring-shaped laser beams ranging from the small to large ring-shaped laser beams, a scanning scanner for scanning the ring-shaped pulsed laser beam branched into a first direction by the beam splitter in X-axis coordinate directions, an indexing scanner for indexing the ring-shaped pulsed laser beam in Y-axis coordinate directions, an fθ lens for applying the ring-shaped pulsed laser beam diffracted into the ring-shaped laser beams ranging from the small to large ring-shaped laser beams to an upper surface, defined by X- and Y-axis coordinates, of the workpiece held on the chuck table, a laser beam applying device for applying a detecting laser beam branched into a second direction by the beam splitter, a half-silvered mirror disposed between the laser beam applying device and the beam splitter, a returning mirror disposed such that the half-silvered mirror and the returning mirror are disposed one on each side of the beam splitter, for returning the detecting laser beam that has passed through the half-silvered mirror to the half-silvered mirror, a photodetector for detecting a laser beam reflected by the half-silvered mirror, and image generating means for generating an image from intensity of the laser beam detected by the photodetector and the X- and Y-axis coordinates of the upper surface of the workpiece to which the ring-shaped laser beams are applied, and wherein, when the ring-shaped laser beams ranging from the small to large ring-shaped laser beams are applied to the upper surface of the workpiece held on the chuck table, the ring-shaped laser beams generate ultrasonic waves in the workpiece, and an interference wave of the ultrasonic waves is converged at a position defined by a Z-axis coordinate in the workpiece to produce vibrations, and the detecting laser beam is applied to the upper surface of the workpiece at a position aligned with the position where the vibrations are produced, and reflected by the upper surface of the workpiece as a first return laser beam modulated by the vibrations, and an interference laser beam produced from the first return laser beam and a second return laser beam generated from the detecting laser beam returned by the returning mirror is guided by the half-silvered mirror to the photodetector, and the image generating means generates an image representing a state near the position where the interference wave is converged.

2. The detecting apparatus according to claim 1, wherein the time differences of the pulsed laser beam diffracted into the ring-shaped laser beams ranging from the small to large ring-shaped laser beams at the respective wavelengths by the ring-shaped generating means are adjusted by the wavelength delaying means thereby to adjust the position defined by the Z-axis coordinate at which the interference wave of the ultrasonic waves is converged in the workpiece.

3. The detecting apparatus according to claim 2, wherein the position defined by the Z-axis coordinate at which the interference wave of the ultrasonic waves is converged in the workpiece is adjusted by delaying, with the wavelength delaying means, time t calculated according to:

$$(H1-H2)/V=t$$

where $H1$ represents a distance from the position at which the interference wave of the ultrasonic waves is converged in the workpiece to the large ring-shaped laser beam on the upper surface of the workpiece, $H2$ represents a distance from the position at which the interference wave of the ultrasonic waves is converged in the workpiece to one of the ring-shaped laser beams that is positioned adjacent to the large ring-shaped laser beam, and $V$ represents a speed of the ultrasonic waves propagated in the workpiece.

4. The detecting apparatus according to claim 1, wherein the ring generating means is an axicon lens assembly including a pair of axicon lenses and a diffraction grating, or a diffractive optical element.

5. The detecting apparatus according to claim 1, wherein the detecting mechanism further includes a display unit for displaying the image generated by the image generating means.

* * * * *